A. BAILEY.
SAFETY CRANKING DEVICE.
APPLICATION FILED JULY 7, 1914.
1,175,499.
Patented Mar. 14, 1916.
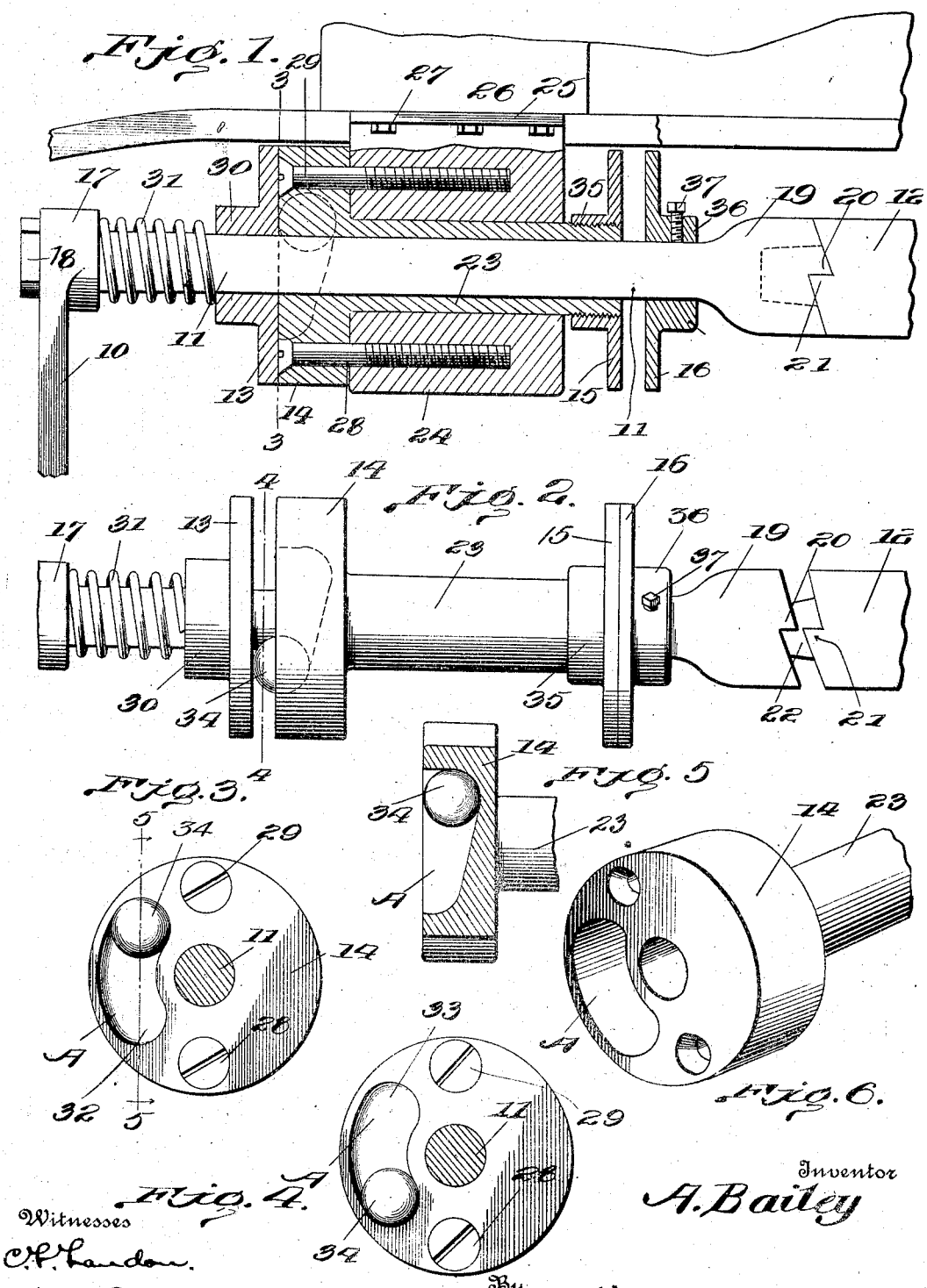

UNITED STATES PATENT OFFICE.

AUBURN BAILEY, OF OAKLAND, CALIFORNIA.

SAFETY CRANKING DEVICE.

1,175,499.  Specification of Letters Patent.  Patented Mar. 14, 1916.

Application filed July 7, 1914. Serial No. 849,457.

*To all whom it may concern:*

Be it known that I, AUBURN BAILEY, citizen of the United States, residing at Oakland, in the county of Alameda and State of California, have invented certain new and useful Improvements in Safety Cranking Devices, of which the following is a specification.

My invention relates to new and useful improvements in safety cranking devices for automobile engines, and as its principal object aims to provide a simple, reliable and efficient device of this character which will be automatically released from the crank shaft of the motor in case back-firing occurs during the cranking operation.

A further and more specific object of my invention is to provide a cranking device in which are constantly associated a releasing element and a braking element.

Another object is to arrange the releasing and braking elements in such manner with respect to each other that, immediately upon the occurrence of back-firing, the releasing device will automatically operate to withdraw the crank from operative engagement with the engine crank shaft, and immediately following this release the braking element will come into action, preventing the continued rotation of the crank from its own momentum.

The above recited and other incidental objects of a similar nature, which will be hereinafter more specifically treated, are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a longitudinal section taken through the cranking device and illustrating it as it is adapted to be applied to an automobile; Fig. 2 is a side elevation of the device; Fig. 3 is a section on the line 3—3 of Fig. 1; Fig. 4 is a section on the line 4—4 of Fig. 1; Fig. 5 is a section on the line 5—5 of Fig. 3; and Fig. 6 is a detail perspective view of one of the releasing disks.

The embodiment of my invention shown in the accompanying drawings consists essentially in a crank 10, a stub-shaft 11, which connects the crank 10 to the crank shaft 12 of the motor, a pair of co-acting safety releasing disks 13 and 14, and a pair of co-acting braking disks 15 and 16. The crank member 10 may be of any well-known type, being provided with a terminal socket 17 which is engaged over the squared outer terminal of the stub shaft 11, and is held against displacement therefrom by a nut 18. The inner terminal of the stub shaft 11 is provided with a clutch 19, the teeth 20 of which are adapted to engage with the clutch teeth 21 of the engine crank shaft 12 when the engine is being cranked. The clutch 19 differs somewhat from the ordinary form of clutch employed in automobile motors in that it is provided with the central socket or cavity in which is insertible a conical stud 22 formed integrally with the terminal of the crank shaft 12. This stud 22, upon being inserted in the socket of the member 19, acts to properly aline the shafts 11 and 12. By this construction the efficiency of the device is not seriously impaired when the bearing in which the member 11 is journaled becomes worn.

The bearing in which the shaft 11 is journaled is in the nature of a sleeve or tube 23 which is formed integrally with the releasing disk 14 and extends laterally from the inner face thereof. This sleeve 23 is received within an attaching bracket 24 which, as shown in Fig. 1 particularly, is provided at its upper terminal with ears 25 adapted to be secured to the base portion of an automobile radiator 26 by means of bolts or similar fastening devices 27. In order to hold the sleeve 23 against accidental withdrawal from the bracket 24, and also to properly hold the disk 14 in position against the outer face thereof, I employ a pair of screws, indicated at 28 and 29. These screws are inserted through the disk 14 adjacent the periphery thereof, having their heads countersunk in the face of the disk and are threaded into the bracket 24, in a manner which will be clearly apparent upon an inspection of Fig. 1. It will now be apparent that, since the stub shaft 11 is slidable through the sleeve 23 and releasing disks 13 and 14, it (the shaft) may be readily moved inwardly to operatively engage the clutch teeth 20 with the clutch teeth 21 of the engine and crank shaft.

As has been previously explained, I employ as a means for automatically releasing the clutch teeth 20 from the clutch teeth 21 in case the engine back-fires during the cranking operation, the co-acting safety releasing disks 13 and 14. The member 14 is, as stated, formed integrally with the sleeve 23, and is secured in fixed position against the bracket 24 by the screw 29. The member 14 is, of course, formed of metal, and is relatively thick, being so designed that a relatively deep channel or groove, indicated in Figs. 3, 4, 5 and 6 particularly by the letter A, may be cored in its outer face.

The disk 13 is made relatively thin inasmuch as it is not necessary to provide this member with any groove. Formed integrally with the disk 13 is a hub or collar 30 which is held against rotation on the stub shaft 11 by a feather or key in the well-known manner. A helical spring, indicated at 31, is, of course, wound about the member 11 and is interposed between the member 17 of the crank 10 and the member 30 whereby the clutch teeth 20 are normally spaced from the clutch teeth 21.

The groove A is arcuate in outline and is relatively shallow at its lower terminal 32 but is relatively deep at its upper terminal 33. Within the groove A is arranged a releasing ball 34 which is of a diameter approximately equal to the depth of the upper terminal of the groove but is approximately equal to twice the depth of the lower terminal 32 of the groove. The purpose in thus forming the groove A and the function of the ball 34 will now become apparent for it will be seen upon reference to Fig. 1 particularly that, when the crank 10 is manipulated to urge the clutch teeth 20 into engagement with the members 21 and the shaft 11 is during this operation partially rotated, the ball 34 will be carried from its normal position from the lower terminal of the groove to the upper terminal of the groove by the pressure exerted by the member 13. When the clutch teeth 20 are properly engaged with the members 21, the ball 34 is disposed at the upper terminal of the groove, and in this position the disk 13 engages flatly against the face of the member 14. In the event that back-firing occurs, however, it is evident that the shaft 11 will be rotated in a counter-clockwise direction, and that, consequently, the disk 13 will, through frictional contact with the ball 34 tend to move this ball in the same direction in which it (the disk 13) is being turned. The tendency of the disk 13 to move the ball 34 in a counter-clockwise direction will, of course, cause the movement of the ball 34 from the deep upper terminal of the groove A to the shallow lower terminal 32 of the groove. Obviously, as the ball moves toward the lower shallow terminal of the groove the member 13 will be spaced from the member 14 until it assumes the position shown in Fig. 2, in which the ball is illustrated at its lowest point. Obviously, the disk 13 on being moved away from the disk 14 will, through the medium of the spring 31, cause the shaft 11 to slide through the sleeve 23 with the resultant withdrawal of the clutch teeth 20 from the clutch teeth 21.

Thus it will be seen that, when the engine back-fires, the crank 10 will be automatically disconnected from the engine crank shaft as soon as it is rotated in a counter-clockwise direction a matter of approximately ninety degrees. While disengagement of the crank 10 from the crank shaft of the engine in this manner will be sufficient under ordinary circumstances to prevent injury to the person cranking the motor, it might sometimes happen that the crank, due to its own momentum, would continue to rotate and strike a blow on the wrist or arm of the operator. In order, therefore, to prevent the crank 10 from continuing to rotate due to its own momentum, I provide the co-acting braking disks, heretofore designated by the numerals 15 and 16. These members 15 and 16 are similar in construction, each being substantially circular in shape, and being preferably formed of metal. At the center of the member 15 is formed an integral sleeve 35 which is internally threaded for engagement with the threaded inner terminal of the sleeve 23, as in Fig. 1. An integral collar 36 is formed on the member 16 at the approximate center thereof and is properly secured on the member 11 by a set-screw 37. It will be obvious that, when the clutch 19 of the member 11 is disengaged from the clutch terminal of the engine crank shaft 12 and the ball 34 has caused the separation of the disks 13 and 14, the disk 16 will have been moved into engagement with the braking disk 15. The frictional engagement of the member 16 with the member 15 is sufficient to prevent the rotation of the crank 10.

From the foregoing description, it will be now apparent that I have provided a relatively simple yet, nevertheless, efficient safety cranking device which may be attached to almost any standard form of automobile by the attachment of the bracket 24 to the base of the radiator of the vehicle. It will also be seen that I have associated in the cranking device two co-acting elements, the first of which operates to automatically release the stub shaft clutch from the engine crank shaft clutch immediately upon the occurrence of back-firing, while the second element operates immediately subsequent to the disengagement of the clutches to exert a braking effect against the continued rotation of the crank as a result of its momentum.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

Having thus described the invention, what I claim as new is:—

1. The combination with an internal combustion engine, of a safety cranking device including a crank, and means for automatically disengaging the crank from the engine crank shaft upon the reverse rotation of the crank shaft, said means including a fixed member free with respect to the crank, a movable member fixed with respect to the crank and movable therewith, and a member adapted to coact with said first mentioned members and movable with respect thereto, said last mentioned member normally gravitating to operative position to hold said first mentioned members spaced apart and being movable to inoperative position housed within one of said first mentioned members.

2. The combination with an internal combustion engine, of a safety cranking device including a crank, means for automatically disengaging the crank from the engine crank shaft upon the reverse rotation of the crank shaft, said means including a fixed member free with respect to the crank, a movable member fixed with respect to the crank and movable therewith, and a member movable with respect to both the first and second mentioned members, and means for braking the crank subsequent to the disengagement of the crank with the engine crank shaft.

3. The combination with an internal combustion engine, of a safety cranking device including a crank handle, a stub shaft having a clutch jaw engageable with the terminal of the engine crank shaft, and means for automatically withdrawing the clutch jaw from engagement with the crank shaft upon the reverse rotation thereof, said means including a fixed disk member free with respect to the stub shaft, a disk member keyed on the stub shaft, and ball member interposed between the first and second mentioned members.

4. The combination with an internal combustion engine, of a safety cranking device including a stub shaft, a crank handle, a clutch jaw formed on the terminal of the crank shaft and engageable with the terminal of the engine crank shaft, means for automatically disengaging the clutch jaw from the engine crank shaft upon the reverse rotation thereof, said means including co-acting fixed and movable disk members, one of which is provided with an arcuate ball receiving groove, and a ball arranged in the groove and engageable by both of the disk members, and a pair of co-acting disk members adapted to frictionally engage for braking the stub shaft subsequent to the disengagement of the clutch jaw from the engine crank shaft.

5. The combination with an internal combustion engine, of a safety cranking device including a stub shaft slidable into engagement with the engine crank shaft, means for automatically disengaging the stub shaft from the engine crank shaft upon the reverse rotation thereof, said means including a pair of co-acting disk members, one of said disk members being relatively fixed and free from the stub shaft and having an arcuate groove, the second of said disk members having a smooth and uninterrupted face and being keyed on the stub shaft, and a ball seated in the said groove and engageable with the second disk.

6. The combination with an internal combustion engine, of a safety cranking device including a stub shaft slidable into engagement with the engine crank shaft, means for automatically disengaging the stub shaft from the engine crank shaft upon the reverse rotation thereof, said means including a pair of co-acting disk members, one of said disk members being relatively fixed and free from the stub shaft and having an arcuate groove which is relatively shallow at one terminal but is relatively deep at the other terminal, the second of said disk members having a smooth and uninterrupted surface and being keyed on the stub shaft, and a ball seated in the said groove and engageable by the second disk.

7. The combination with an internal combustion engine, of a safety cranking device including a stub shaft, a crank handle carried thereby, a clutch jaw formed on the stub shaft and engageable with the terminal of the engine crank shaft, a pair of co-acting disk members, and a ball member interposed between the adjacent faces of said disk members, said disk members and ball member being adapted to automatically disengage the clutch jaw from the engine crank shaft upon the reverse rotation of said crank shaft, and a pair of co-acting braking disks, one of which is relatively fixed and is free from the stub shaft, and the other of which is carried by the stub shaft and is rotatable therewith, being adapted to engage the fixed disk for braking the rotation of the stub shaft subsequent to the disengagement of the clutch thereof with the engine crank shaft.

8. The combination with an internal combustion engine having a shaft, a cranking shaft associated therewith, and coacting clutch members for operatively connecting the shafts, of means for releasing the said clutch members upon the reverse rotation of the engine shaft, said means including a pair of releasing disks, one of which is provided with an arcuate groove, and a ball member seated in the groove and freely movable therein to coact with the said disks.

9. The combination with an internal combustion engine having a shaft, a cranking shaft associated therewith, and coacting clutch members for operatively connecting the shafts, of means for automatically releasing the said clutch member upon the reverse rotation of the engine shaft, said means including a disk keyed on the cranking shaft, a disk freely receiving the said cranking shaft, one of said disks being provided with a facial groove which is of arcuate shape and increases in depth from one end toward the other end, it being relatively shallow at one end and relatively deep at the other end, and a ball member freely seated in the groove and freely movable therethrough to coact with the said disks.

10. The combination with an internal combustion engine having a shaft, a cranking shaft associated therewith, and coacting clutch members for operatively connecting the shafts, of means for releasing the said clutch members upon the reverse rotation of the engine shaft, said means including a fixed member constituting a bearing for the cranking shaft and having a facial groove, a ball member seated in the groove and movable therethrough, and a member keyed on the cranking shaft for rotation therewith, the ball member being adapted to coact with said fixed member and said last mentioned member.

In testimony whereof I affix my signature in presence of two witnesses.

AUBURN BAILEY. [L. S.]

Witnesses:
G. E. FISHER,
E. S. SYLVESTER.